US007225159B2

(12) United States Patent
DeMello et al.

(10) Patent No.: US 7,225,159 B2
(45) Date of Patent: May 29, 2007

(54) METHOD FOR AUTHENTICATING AND SECURING INTEGRATED BOOKSTORE ENTRIES

(75) Inventors: Marco A. DeMello, Redmond, WA (US); Attila Narin, Bothell, WA (US); Yoram Yaacovi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 928 days.

(21) Appl. No.: 09/836,524

(22) Filed: Apr. 17, 2001

(65) Prior Publication Data

US 2002/0002540 A1    Jan. 3, 2002

Related U.S. Application Data

(60) Provisional application No. 60/215,339, filed on Jun. 30, 2000.

(51) Int. Cl.
*G06Q 99/00* (2006.01)
*H04K 1/00* (2006.01)
*H04L 9/00* (2006.01)
*G06F 7/00* (2006.01)
*G06F 15/16* (2006.01)

(52) U.S. Cl. .............................. 705/51; 705/26; 707/10; 707/3; 709/217

(58) Field of Classification Search .................. 705/26, 705/27, 51; 707/10, 2; 709/202, 219
See application file for complete search history.

(56) References Cited

U.S. PATENT DOCUMENTS

| 4,405,829 A | 9/1983 | Rivest et al. .............. 178/22.1 |
| 4,688,169 A | 8/1987 | Joshi .......................... 364/200 |
| 4,827,508 A | 5/1989 | Shear ............................. 380/4 |
| 4,924,378 A | 5/1990 | Hershey et al. ............. 713/201 |
| 4,977,594 A | 12/1990 | Shear ............................ 380/4 |
| 5,050,213 A | 9/1991 | Shear .......................... 380/25 |
| 5,191,573 A | 3/1993 | Hair ............................. 369/84 |
| 5,222,134 A | 6/1993 | Waite et al. ................... 380/4 |
| 5,359,659 A | 10/1994 | Rosenthal ...................... 380/4 |

(Continued)

FOREIGN PATENT DOCUMENTS

EP    0 715 245 A1    6/1996

(Continued)

OTHER PUBLICATIONS

Hui Luo, A server-independent password authentication method for access controlled Web pages, 2000 vol. 1 pp. 361-364.*

(Continued)

*Primary Examiner*—Calvin Hewitt
*Assistant Examiner*—Charlie C. L. Agwumezie
(74) *Attorney, Agent, or Firm*—Woodcock Washburn LLP

(57) ABSTRACT

A method and system for providing an electronic shopping service integrated into a software application, and for controlling the set of web sites that are reachable from within the shopping service. Each web site is represented by data which is signed by a private key, and the data together with this signature is delivered to a plurality of computing devices that provide the shopping service. Each of the computing devices has access to the public key that corresponds to the private key, and uses the public key to verify the signature. The computing device displays links to those web sites whose representative data validates against the signature.

23 Claims, 14 Drawing Sheets

U.S. PATENT DOCUMENTS

| | | | |
|---|---|---|---|
| 5,410,598 A | 4/1995 | Shear | 380/4 |
| 5,509,070 A | 4/1996 | Schull | 380/4 |
| 5,530,235 A | 6/1996 | Stefik et al. | 235/492 |
| 5,606,609 A | 2/1997 | Houser et al. | 380/4 |
| 5,625,693 A | 4/1997 | Rohatgi et al. | 380/23 |
| 5,629,980 A | 5/1997 | Stefik et al. | 380/4 |
| 5,634,012 A | 5/1997 | Stefik et al. | 395/239 |
| 5,638,443 A | 6/1997 | Stefik et al. | 380/4 |
| 5,654,746 A | 8/1997 | McMullan, Jr. et al. | 725/29 |
| 5,666,411 A | 9/1997 | McCarty | 705/51 |
| 5,675,734 A | 10/1997 | Hair | 395/200.01 |
| 5,708,780 A | 1/1998 | Levergood et al. | 395/200.12 |
| 5,715,403 A | 2/1998 | Stefik | 395/244 |
| 5,724,425 A | 3/1998 | Chang et al. | 380/25 |
| 5,734,823 A | 3/1998 | Saigh et al. | 395/200.06 |
| 5,734,891 A | 3/1998 | Saigh | 395/610 |
| 5,742,677 A | 4/1998 | Pinder et al. | 380/242 |
| 5,765,152 A | 6/1998 | Erickson | 707/9 |
| 5,784,609 A | 7/1998 | Kurihara | 707/9 |
| 5,809,145 A | 9/1998 | Slik et al. | 380/25 |
| 5,832,451 A | 11/1998 | Flake et al. | 705/5 |
| 5,835,732 A | 11/1998 | Kikinis et al. | 395/281 |
| 5,845,281 A | 12/1998 | Benson et al. | 707/9 |
| 5,864,620 A | 1/1999 | Pettitt | 380/4 |
| 5,883,955 A | 3/1999 | Ronning | 380/4 |
| 5,892,900 A | 4/1999 | Ginter et al. | 395/186 |
| 5,910,987 A | 6/1999 | Ginter et al. | 380/24 |
| 5,915,019 A | 6/1999 | Ginter et al. | 380/4 |
| 5,917,912 A | 6/1999 | Ginter et al. | 380/24 |
| 5,920,861 A | 7/1999 | Hall et al. | 707/9 |
| 5,933,498 A | 8/1999 | Schneck et al. | 380/4 |
| 5,940,504 A | 8/1999 | Griswold | 380/4 |
| 5,943,422 A | 8/1999 | Van Wie et al. | 380/9 |
| 5,949,876 A | 9/1999 | Ginter et al. | 380/4 |
| 5,958,051 A * | 9/1999 | Renaud et al. | 726/22 |
| 5,970,475 A | 10/1999 | Barnes et al. | 705/27 |
| 5,982,891 A | 11/1999 | Ginter et al. | 380/4 |
| 5,983,245 A | 11/1999 | Newman et al. | 707/513 |
| 5,983,273 A | 11/1999 | White et al. | 709/229 |
| 5,991,399 A | 11/1999 | Graunke et al. | 380/4 |
| 5,991,402 A | 11/1999 | Jia et al. | 705/59 |
| 5,999,622 A | 12/1999 | Yasukawa et al. | 380/4 |
| 6,006,332 A | 12/1999 | Rabne et al. | 713/201 |
| 6,018,724 A | 1/2000 | Arent | 705/44 |
| 6,021,492 A | 2/2000 | May | 713/200 |
| 6,029,046 A | 2/2000 | Khan et al. | 725/31 |
| 6,029,141 A | 2/2000 | Bezos et al. | 705/27 |
| 6,035,403 A | 3/2000 | Subbiah et al. | 713/201 |
| 6,037,935 A | 3/2000 | Bates et al. | 345/760 |
| 6,049,612 A | 4/2000 | Fiedler et al. | 380/44 |
| 6,064,979 A * | 5/2000 | Perkowski | 705/26 |
| 6,067,582 A | 5/2000 | Smith et al. | 710/5 |
| 6,088,717 A * | 7/2000 | Reed et al. | 709/201 |
| 6,133,916 A | 10/2000 | Bukszar et al. | 345/335 |
| 6,195,667 B1 * | 2/2001 | Duga et al. | 715/513 |
| 6,199,053 B1 | 3/2001 | Herbert et al. | 705/76 |
| 6,226,618 B1 | 5/2001 | Downs et al. | 705/1 |
| 6,298,446 B1 | 10/2001 | Schreiber et al. | 713/201 |
| 6,311,269 B2 | 10/2001 | Luckenbaugh et al. | 713/154 |
| 6,324,288 B1 | 11/2001 | Hoffman | 380/249 |
| 6,331,865 B1 * | 12/2001 | Sachs et al. | 715/776 |
| 6,363,356 B1 | 3/2002 | Horstmann | 705/26 |
| 6,385,596 B1 | 5/2002 | Wiser et al. | 705/51 |
| 6,415,270 B1 | 7/2002 | Rackson et al. | 705/37 |
| 6,425,017 B1 | 7/2002 | Dievendorff et al. | 709/315 |
| 6,449,645 B1 | 9/2002 | Nash | 709/224 |
| 6,606,604 B1 | 8/2003 | Dutta | 705/26 |
| 6,629,138 B1 | 9/2003 | Lambert et al. | 709/224 |
| 6,636,896 B1 | 10/2003 | Philyaw | 709/238 |
| 6,694,320 B1 | 2/2004 | Ortiz et al. | 707/101 |
| 6,718,361 B1 | 4/2004 | Basani et al. | 709/201 |
| 6,753,887 B2 | 6/2004 | Carolan et al. | 345/764 |
| 2001/0011238 A1 | 8/2001 | Ebergard et al. | 705/27 |
| 2001/0037302 A1 * | 11/2001 | McFadzean et al. | 705/51 |
| 2002/0002611 A1 | 1/2002 | Vange | 709/223 |
| 2002/0023059 A1 * | 2/2002 | Bari et al. | 705/76 |
| 2002/0033844 A1 | 3/2002 | Levy et al. | 345/744 |
| 2002/0065772 A1 | 5/2002 | Saliba et al. | 705/40 |
| 2002/0069265 A1 | 6/2002 | Bountour et al. | 709/219 |
| 2002/0120507 A1 | 8/2002 | Chanos et al. | 705/14 |
| 2002/0138555 A1 | 9/2002 | Yu | 709/203 |
| 2002/0143813 A1 | 10/2002 | Jellum et al. | 707/511 |
| 2002/0169805 A1 | 11/2002 | Edge | 707/528 |
| 2003/0167392 A1 * | 9/2003 | Fransdonk | 713/156 |
| 2005/0010475 A1 * | 1/2005 | Perkowski et al. | 705/14 |

FOREIGN PATENT DOCUMENTS

| | | | |
|---|---|---|---|
| EP | 0 798 892 A2 * | 1/1997 | |
| EP | 0 778 512 A2 | 6/1997 | |
| EP | 0 795 809 A2 | 9/1997 | |
| EP | 0 798 892 A2 | 10/1997 | |
| EP | 0 843 449 A2 | 5/1998 | |
| WO | WO 96/24092 | 8/1996 | |
| WO | WO 96/42041 | 12/1996 | |
| WO | WO 98/44402 | 10/1998 | |
| WO | WO 98/45768 | 10/1998 | |
| WO | WO 98/58306 | 12/1998 | |
| WO | WO 99/01815 | 1/1999 | |
| WO | WO 99/26123 | 5/1999 | |
| WO | WO 99/45491 | 9/1999 | |
| WO | WO 99/55055 | 12/1999 | |
| WO | WO 99/63416 | 12/1999 | |
| WO | WO 00/08909 | 2/2000 | |
| WO | WO 00/21239 | 4/2000 | |
| WO | WO 00/75760 A1 | 12/2000 | |

OTHER PUBLICATIONS

"OpeneBook Publications Structure 1.0";Sep. 16, 1999; www.openebook.org/oebpsdownload.htm.

Shamir, A. et al., "Playing Hide and Seek with Stored Keys", *Third International Conference*, 1999, franklin, M. (ed), 118-124.

Auchsmith, D., "Tamper Resistant Software: An Implementation", *First International Workshop*, Anderson, Ross (ed.,) 1996, 317-333.

Jaeger, T., "Flexible Control of Downloaded Executable Content", *ACM Transactions on Information and System Security*, 1999, 2(2), 177-228.

Takahasi, K., et al., "Intelligent Pages: Collecting Shop and Service Infromation With Software Agents," *Applied Artificial Intelligence*, Sep., 1997, 11(6), 489-499.

Yoon, Seong Soon, et al., "Prototype Development of Directory Interface on Web Browser," *Computer & Software Technol. Lab., ETRI*, Feb. 15-18, 1999, 90-92.

Uehara, S., et al., "Enterprise Model-Based Software Architecture With Server Component Integration," *Fujitsu Laboratories Ltd.*, 1998, 356-363.

"OpeneBook™Publications Structure 1.0.1", Recommended Specification Jul. 2, 2001, www.openebook.org/oebpsdownload.htm.

* cited by examiner

METHOD FOR AUTHENTICATING AND SECURING INTEGRATED BOOKSTORE ENTRIES

CROSS-REFERENCE TO RELATED CASES

This application claims the benefit of U.S. Provisional Application No. 60/215,339, entitled "Method and System for Authenticating and Securing Integrated Bookstore Entries," filed on Jun. 30, 2000, which is hereby incorporated by reference.

COPYRIGHT INFORMATION

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

FIELD OF THE INVENTION

The present invention relates generally to the field of computing. More particularly, the invention relates to a system and method for providing an integrated shopping service within an application program. One specific application of such an integrated shopping service is a service that allows users of a content-rendering application to shop for digital content at a dynamically-updatable set of retail web sites. The invention further provides for control over the dynamically-updatable set of retail web sites through cryptographic signing and authentication.

BACKGROUND OF THE INVENTION

Certain software requires third parties to provide digital content in order to make the software valuable to users. A prime example is an application for rendering books, audio, video, etc. Such an application is useful only when digital content—e.g., text, audio, video, etc.—is available for use with the application or device, and such digital content is generally provided by third parties.

Typically, a user obtains the content by using a stand-alone web browser (e.g. INTERNET EXPLORER or NETSCAPE NAVIGATOR) to find and obtain content from Internet web sites that provide it. Sites that distribute content may be located with the aid of a search engine. This method, however, does not offer the user the convenience of shopping for content from within the rendering application.

As an alternative to the stand-alone browser, a browser may be integrated into the content-rendering application, and the application may be hard-coded to point the browser to one or more web sites that provide content. This approach, however, has drawbacks; if the universal record locators (URLs) of particular web sites are hard-coded into the browser, it is difficult to add or delete web sites to or from the list, or to customize the list for different instances of the application.

One solution is to support modification of the list; however, the manufacturer of the content-rendering application or device may have legitimate interests in limiting the set of content providers who are included on the list. For example, the manufacturer may wish to ensure that the content providers adhere to technical standards, or may wish to foster business relationships with certain content providers by granting them exclusive or semi-exclusive membership on the list. If the list can be modified without restriction, then the manufacturer of the application loses the ability to serve these interests by controlling who is on the list.

In view of the foregoing, there is a need for a system that overcomes the drawbacks of the prior art.

SUMMARY OF THE INVENTION

The present invention provides an infrastructure for a shopping service within a user application, such as a content-rendering application. An application in accordance with the invention includes a link to a retail directory server (e.g., the application may store the universal record locator or "URL" of such a server). Upon being contacted by the application, the retail directory server renders on the user's machine a web page containing a list of retail web sites. The web page rendered by the retail directory server offers the user the chance to add some or all of the listed sites to a private list of retailers that is stored on the client machine. The particular set of retail sites listed in the directory server can be modified at any time by the party who controls the directory server. An application in accordance with the invention also includes a retail shopping user interface, which displays to the user all retailers in his or her private list and allows the user to connect to any of the retailers on that list. A retail shopping service is thus "integrated" into the application.

In one embodiment of the invention, the application that incorporates an integrated shopping service is a content-rendering application, such as an eBooks reading application. In such an application, the integrated shopping service may take the form of an "integrated bookstore," which displays a list of on-line bookstores that sell eBooks and allows the user to navigate to those bookstores directly through the list. The retail directory server whose URL is included in the application may provide a "bookstore directory," which renders a list of on-line bookstores on the user's machine and offers the user the opportunity to add those bookstores to his or her private list. The actual list of bookstores displayed to the user as part of the application's "integrated bookstore" is the private list of bookstores chosen by the user from the bookstore directory page.

In another embodiment, the retail directory server may be configured to provide arbitrary data to the user's machine, rather than merely a list of retail web sites. For example, the directory server may download to the user's machine a set of off-line catalogues that the user can use to shop for content when not connected to the Internet. For example, if the user's machine is a palm-size computer, the user may be able to shop off-line for content, where off-line orders are stored for transmission to an appropriate web site when the device is cradled. The user's machine may store parameters (e.g., in the form of cookies) that allow customized content to be delivered to the user from the retail directory server. For example, the user may subscribe to an on-line newsletter (e.g., through a previous contact with the retail directory), and this newsletter may then be updated on the user's machine each time the bookstore directory server is contacted. In contrast to systems that merely hardcode a list of retail web sites into an application, the use of a bookstore directory server, whose information can be updated or modified at any time, supports extensibility of the directory function. According to an aspect of the invention, where the directory comprises a list of web sites, each web site is represented in the directory by signed data. The signed data is copied to the user's private list when the user selects a site from the directory. The integrated shopping feature of the application authenticates the site in the user's private list before displaying the site as part of the user interface of the shopping service 300 or pointing a web browser to the site represented by that data.

The invention also provides a tool for signing the information so that it can be authenticated by the application. By controlling the use of the signing tool, the manufacturer of the application can control which web sites are placed in the directory, and thus prevent the application from pointing the browser to "rogue" sites that have been added to the directory without approval from the application manufacturer (or another entity that controls the constituency of the directory).

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

The Internet has provided consumers with opportunities to shop for numerous and varied products on line. Using a browser, a consumer can visit a seemingly limitless number of web sites and purchase nearly any type of good or service. Some types of goods, and services, however, are particularly adapted to be used with certain software applications. A case in point is digital content (e.g., books, audio, video, etc.) that comes delivered in a particular format for use with a certain type of rendering application (e.g., an electronic book reader, an audio player, a video player, etc.). It is particularly useful for a consumer to be able to purchase such content from within the rendering application itself. It is further useful to limit the universe of web sites that a consumer can access from within the rendering application to those web sites that distribute digital content adapted for the application. The present invention provides an architecture for a shopping service that allows a user to visit certain web sites (e.g., retail web sites) from within an application, and that allows a third party entity to control which web sites can be accessed from within the application.

Exemplary Computing Environment

Figure 1:
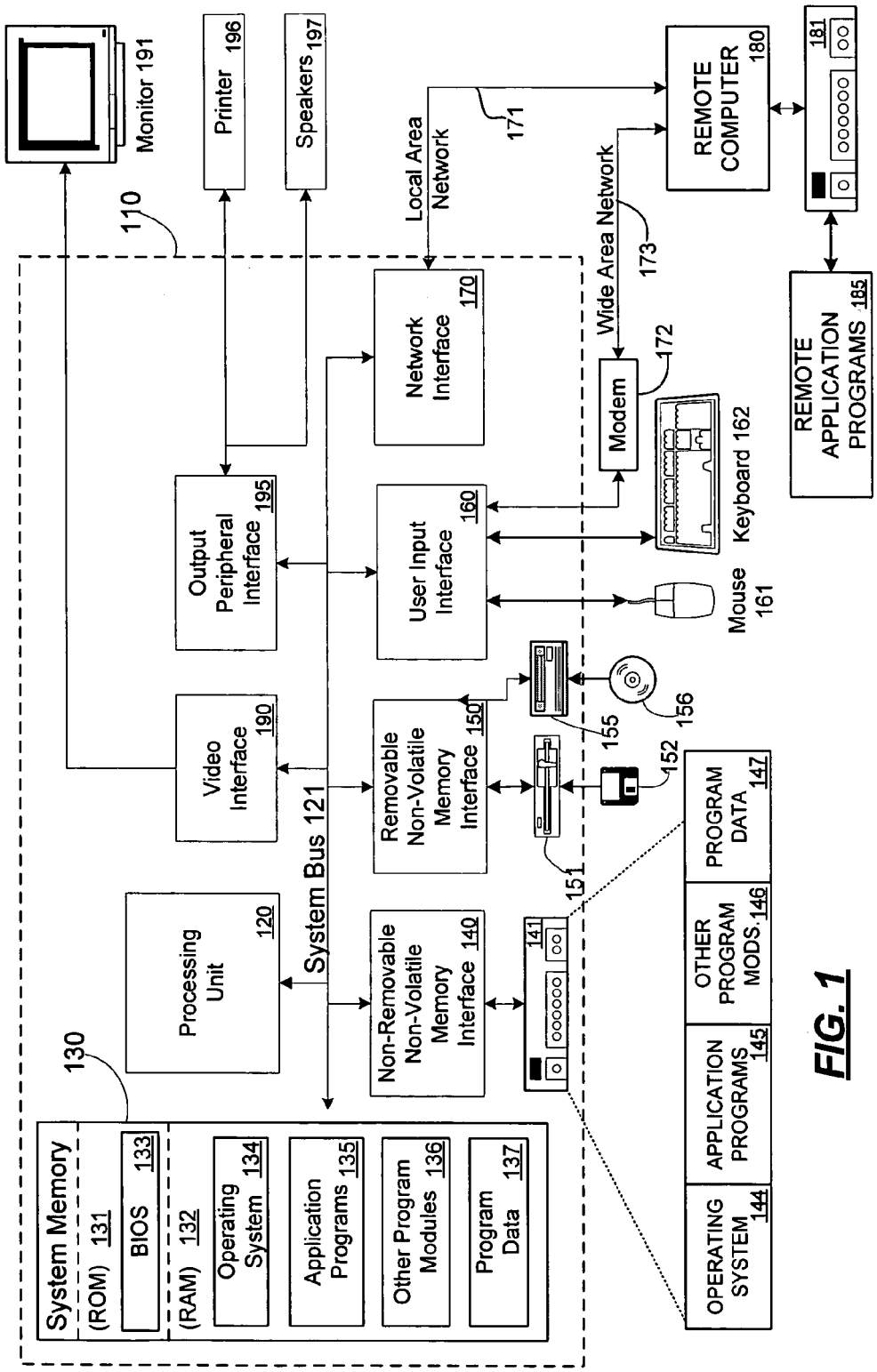
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Application with Integrated Shopping Feature

Figure 2:
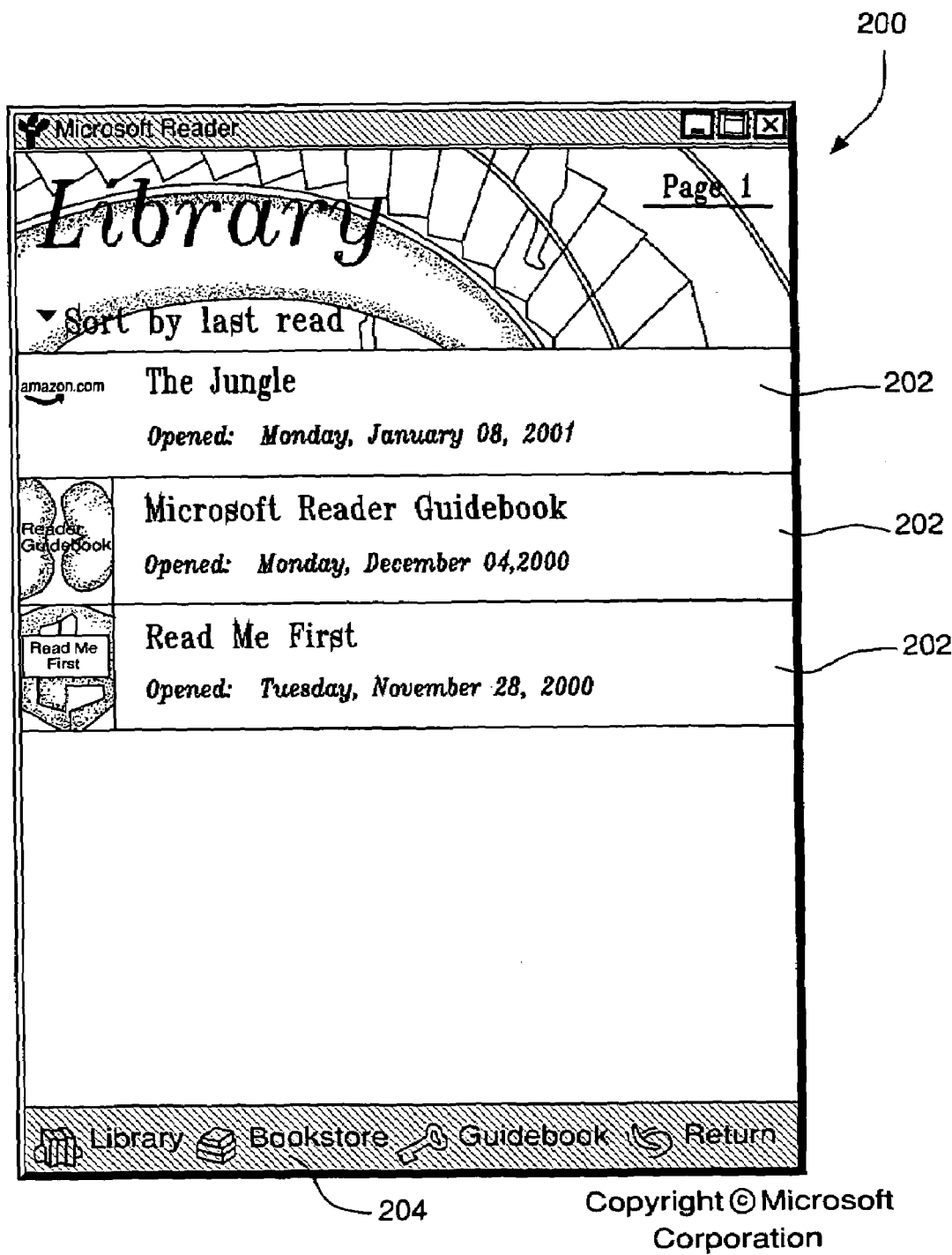
FIG. 2 is a diagram of a user interface for an exemplary software application in accordance with aspects of the invention.

Referring now to FIG. 2, there is shown a user interface of an application 200. In FIG. 2, application 200 is depicted as a text-rendering application for reading electronic books ("eBooks") 202. It will be appreciated, however, that a text-rendering application is merely exemplary, and application 200 may be any type of application. For example, application 200 may be a rendering application that renders other types of content (e.g., music, video, multimedia, etc.). As described below, it is particularly useful to incorporate an integrated shopping feature into a content-rendering application, because the integrated shopping feature may be used to shop for digital content that is adapted to be rendered by the rendering application. However, application 200 need not be such a rendering application. In greater generality, application 200 may be any application in which it is useful or desirable to incorporate an integrated shopping feature as described below. All such embodiments of application 200 are within the spirit and scope of the invention.

As noted above, in the example of FIG. 2 application 200 renders eBooks 202. eBooks are known in the art and are described generally in "Open eBook Publication Structure 1.0" (Sep. 16, 1999), available at http://www.openebook.org/oebpsdownload.htm, which is incorporated herein by reference. Typically (although not necessarily), eBooks are obtained separately from the application used to render them—i.e., the user uses a stand-alone browser to navigate to a web site that distributes eBooks, chooses an eBook, and then downloads a file containing the eBooks to the user's computing device, at which point the user may use application 200 to "click" on one of eBooks 202 (e.g., by using pointing device 161, shown in FIG. 1) in order to open and render the eBook. At least some of eBooks 202 may have been obtained by a user's navigating to a web site and obtaining the book (either directly or indirectly) from that web site. However, since text-rendering application 200 is of limited value without a source of eBooks, it is particularly useful to incorporate into application 200 a shopping feature that permits a user to shop for eBooks from within application 200. The present invention provides such a feature.

Figure 3:
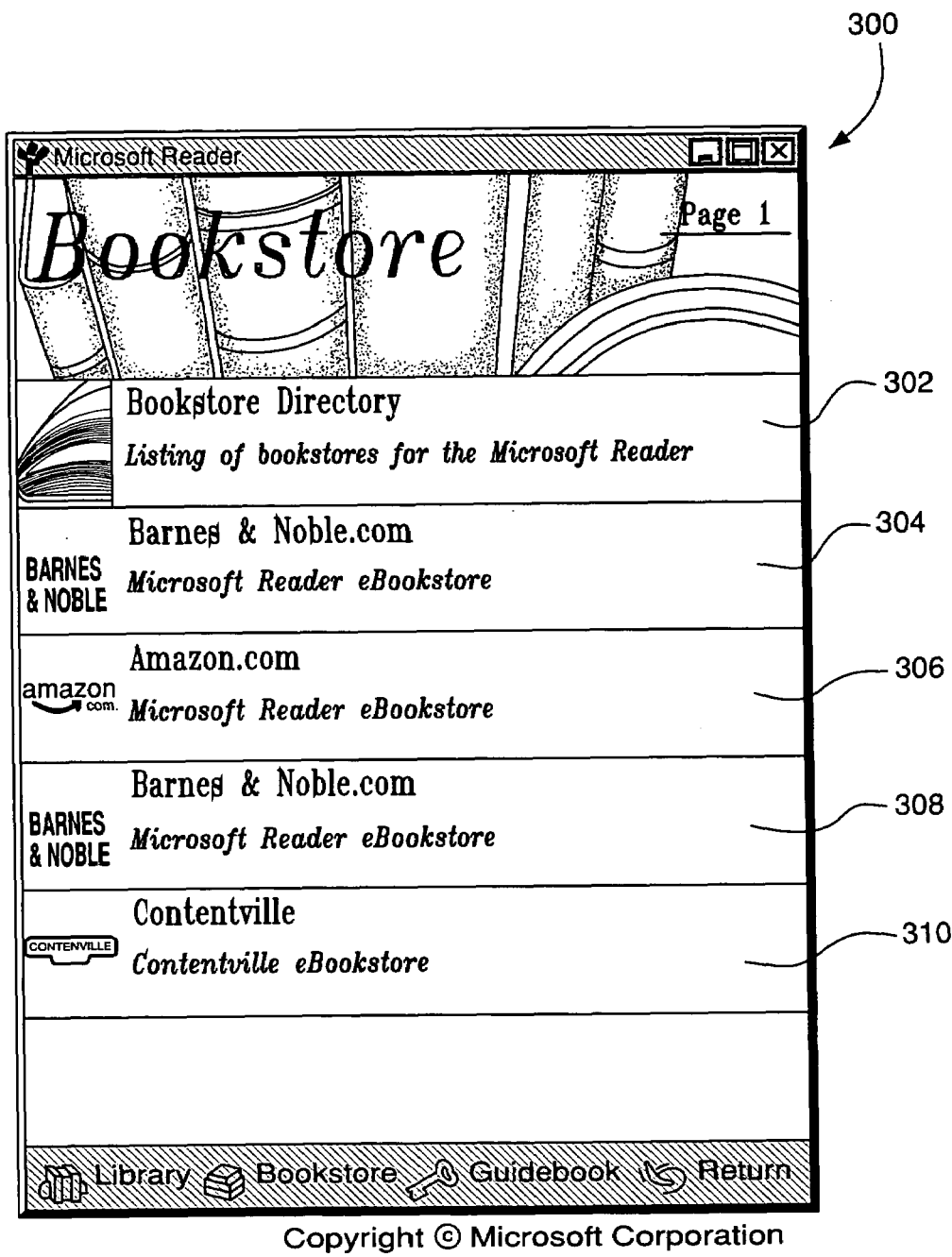
FIG. 3 is a diagram of a user interface for an exemplary shopping service which, in accordance with aspects of the invention, is integrated into a software application.

FIG. 3 shows a user interface for an exemplary shopping service 300 in accordance with the invention. Preferably, shopping service 300 provides an interface whereby a user may visit web sites from within application 200. For example, the exemplary interface shown in FIG. 3 includes a list of links 302–310; clicking one of the links (e.g., by using pointing device 161, shown in FIG. 1) allows the user to visit the web site indicated by the link. At least some of the links are links to web sites that perform retail functions, such as the selling of digital content. FIG. 3 shows an example where shopping service 300 is adapted to an eBook-reading application, and thus links 304, 306, 308, and 310 are links to sites that distribute eBooks. For example, a user of the application depicted in FIG. 2 might click on the "bookstore" icon 204 in order to shop for eBooks, thereby invoking the shopping service depicted in FIG. 3. It will be appreciated that, when shopping service 300 is associated with an application other than an eBooks-reading application, the links provided in the shopping service may be links to web sites that distribute different types of products. For example, if shopping service 300 were associated with an audio- or video-rendering application, then shopping service 300 would preferably display links to web sites that distribute digital audio or video.

In a preferred embodiment, shopping service 300 comprises a form of web browser. For example, the web browser may be a standard web browser with a simplified user interface (that may include fewer user functions than the standard user interface when the browser is opened as a stand-alone). When shopping service 300 comprises a form of web browser, the logic that implements shopping service 300 is capable of displaying and following links to any web site, regardless of whether the web site is a retail web site, and regardless of whether the web site sells products that are related to the application 200 of which shopping service 300 is a part. The particular choice of links displayed (i.e., the fact that at least some of the links are to retail web sites) allows the web browser to function as a shopping service. It will be noted, however, that in the example of FIG. 3, one of the links (i.e., link 302) is not a link to a retail web site, but rather a link to a "bookstore directory," which is described below. The web-browsing logic that shopping service 300 uses to visit web sites is preferably content-agnostic to the type of information contained at the web site; as long as a link is properly listed in shopping service 300, the web browser will follow the link regardless of what type of information is maintained at the site.

Figure 4:
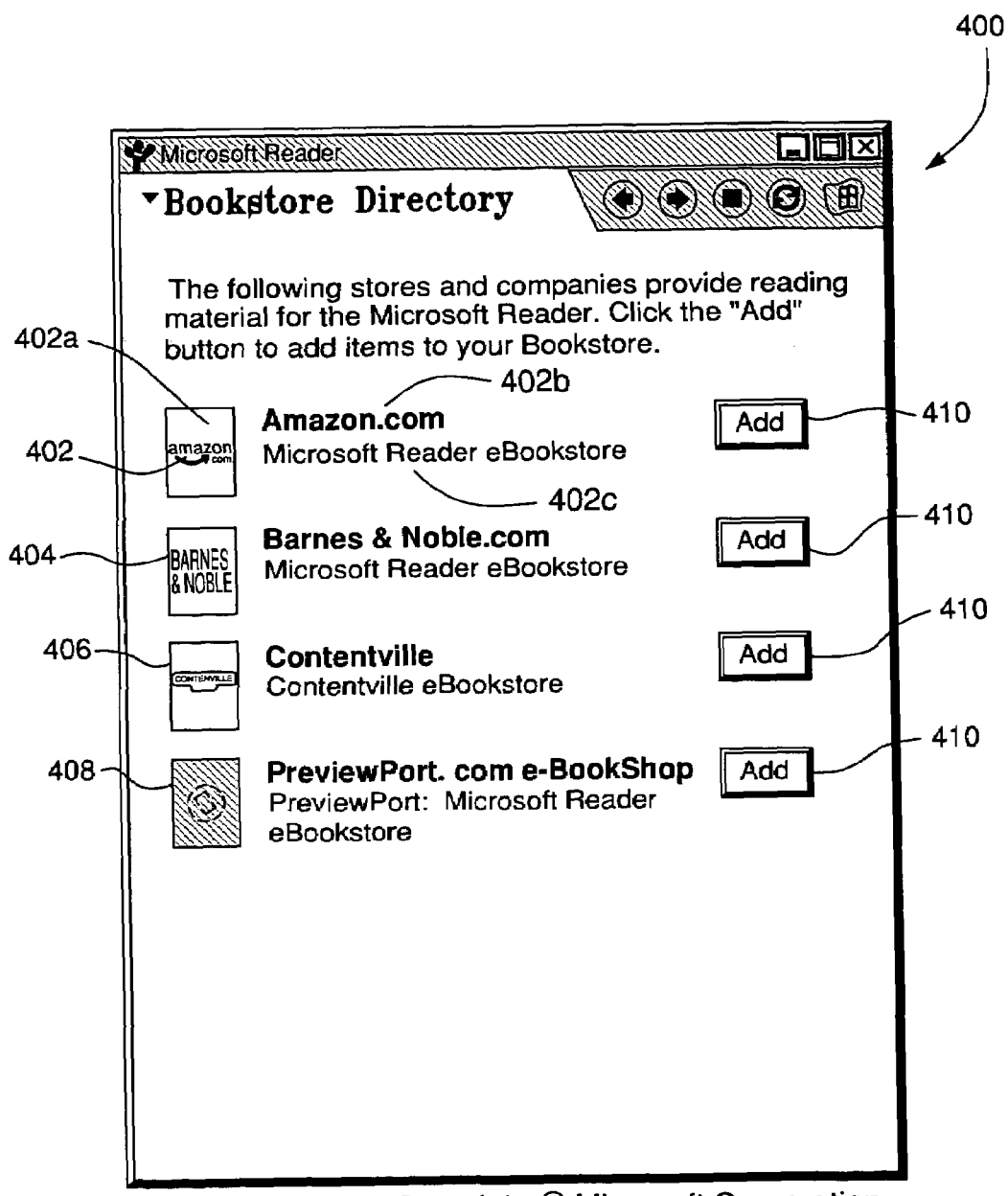
FIG. 4 is a diagram of a retail directory, as displayed on typical web browsing software.

FIG. 4 shows a retail directory 400, as might be displayed on web browsing software. In FIG. 4, retail directory 400 is shown as a "bookstore directory"—i.e., a directory of electronic "bookstores" that sell eBooks—although it will be understood that a directory of eBooks vendors is merely exemplary, and retail directory 400 may comprise a list of any type of web sites without departing from the spirit and scope of the invention. "Web browsing software," in this context, includes general purpose web browsers such as MICROSOFT INTERNET EXPLORER. Preferably, the "web browsing software" is the web browsing functionality associated with shopping service 300, as described above in connection with FIG. 3. As explained below, this web browsing functionality may include special purpose web browsing logic within the application 200 of which integrated shopping service 300 is a part. (As further discussed below, the web browsing functionality that implements a shopping service within an application may, in fact, be provided by a general purpose web browsing program such as INTERNET EXPLORER.) In a preferred embodiment, a user accesses retail directory 400 by clicking a link such as link 302 (shown in FIG. 3) within a shopping service 300.

Retail directory 400 preferably comprises a web page that lists one or more retail web sites. The exemplary retail directory 400 in FIG. 4 lists retail web sites 402, 404, 406, and 408. Each listing includes various components. For example, listing 402 includes a logo 402a, a web site name 402b, and a web site description 402c. Associated with each listing is an "add" button 410. By clicking on the "add" button 410 associated with a particular web site listing, the user adds the web site to his or her personal list of retail web sites. (The process of using the retail directory 400 to add web sites to a personal list is described below in connection with FIG. 8.) Thus, retail directory 400 contains a list of web sites that a user can choose to add to the list displayed by integrated shopping feature 300, and integrated shopping service 300 will display those web sites that the user has selected from retail directory 400. (It should be noted that, in some cases, the integrated shopping feature may be configured to display certain web sites without the user's having selected those sites from retail directory 400.)

Structure of an Application Having an Integrated Shopping Service

Figure 5:
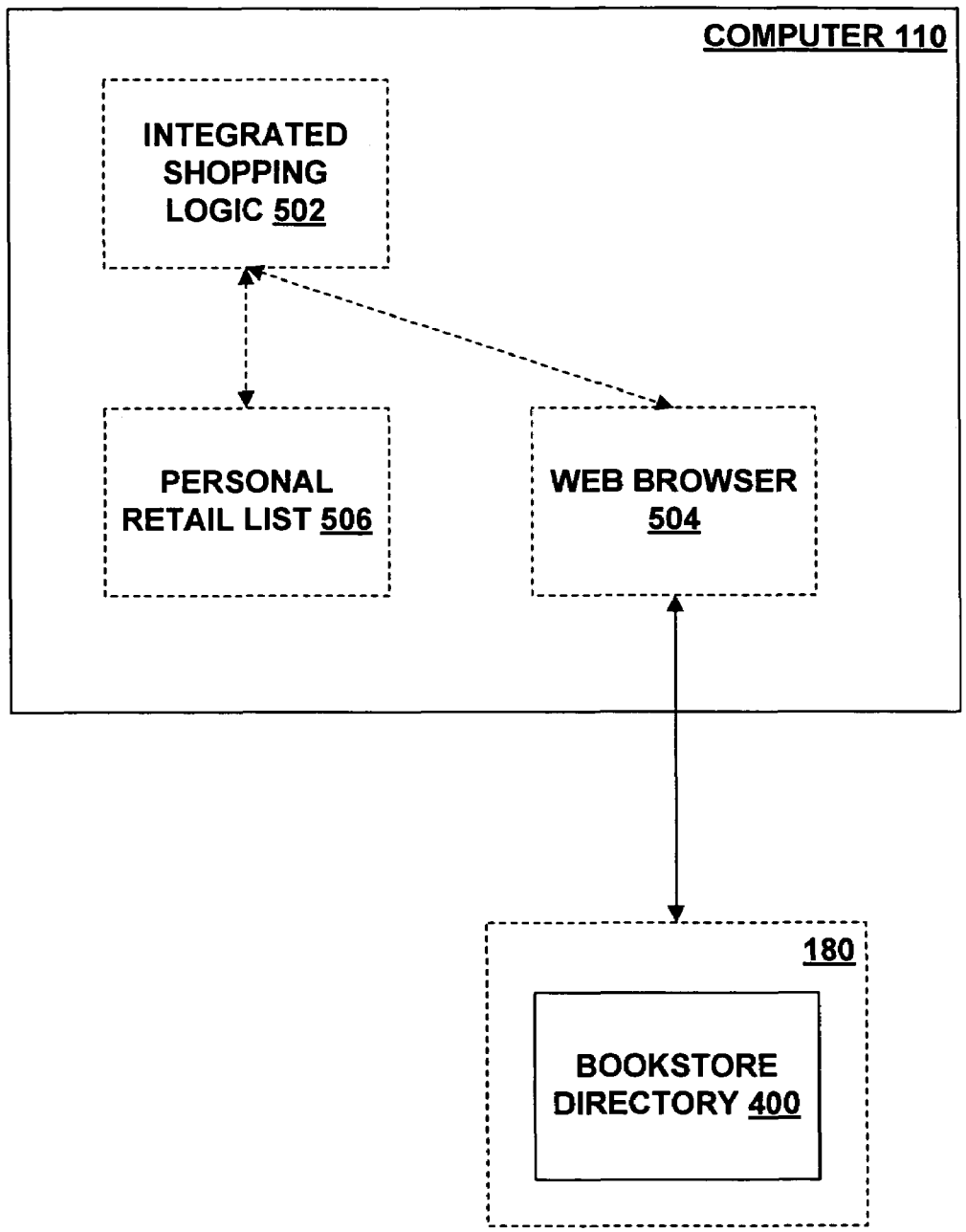
FIG. 5 is a block diagram of a software application having an integrated shopping service according to aspects of the invention.

Referring now to FIG. 5, there is shown an exemplary structure of an application 200 that employs an integrated shopping service 300. Application 200 (which runs on computer 110, shown in FIG. 1), includes integrated shopping logic 502. Integrated shopping logic 502 comprises software which performs functions including: (a) providing the user interface (UI) and functionality that enables a user to visit retail web sites; and (b) maintaining a list of retail web sites that a user may visit as part of integrated shopping service 300.

Integrated shopping logic 502 may employ or provide web browser 504, in order to provide the UI and functionality that permits the visiting of retail web sites. For example, integrated shopping logic 502 may include instructions that starts web browser 504 whenever the user invokes integrated shopping service 300. Web browser 504 may be a web-browsing module that is specially adapted to work with application 200. Alternatively, web browser 504 may be a general-purpose web browser such as the INTERNET EXPLORER browser, which can be invoked from within application 200. When web browser 504 is embodied as a general purpose web browser, application 200 may invoke web browser 504 in such a way that it appears to a user as if it were included within application 200—e.g., integrated shopping logic 502 may invoke web browser 504 inside the window of application 200.

Integrated shopping logic 502 may also employ or provide a personal retail list 506. Personal retail list 506 includes the list of links that are to be displayed by web browser 504. For example, referring back to FIG. 3, in exemplary integrated shopping service 300 links 302–310 may be stored in personal retail list 506. Thus, in a preferred embodiment, application 200 implements an integrated shopping service by invoking web browser 504 and instructing it to display the links found in personal retail list 506.

Integrated shopping logic 502 may include the capability to add (or delete) items from personal retail list 506. In the example of FIG. 5, integrated shopping logic 502 uses web browser 504 to access retail directory 400, and adds new retail sites from retail directory 400 to personal retail list 506. For example, retail directory 400 may be implemented on a remote computer (e.g., remote computer 180, shown in FIG. 1), which functions as a "retail directory server." Retail directory 400 may take the form of an HTML file which is stored on remote computer 180, and which is dynamically updateable to reflect a current list of retail site choices. Thus, the HTML file and the remote computer 180 on which it is stored may be represented together as a universal record locator (URL). A user may access retail directory 400 by clicking on a link (e.g., link 302 shown in FIG. 3), which navigates to the URL of the retail directory 400. When a user accesses retail directory 400, web browser 504 displays the retail directory HTML file as a web page (e.g., the web page shown in FIG. 4). When the user clicks an "add" button 410 for a particular retail web site listed in retail directory 400, logic stored in the web pages executes, thereby causing data representative of the selected retail web site to be downloaded from remote computer 180 to the user's computer 110. Integrated shopping logic 502 then stores the downloaded data in personal retail list 506.

It should be observed that web browser 504 and personal retail list 506 are shown in FIG. 5 as being within application 200. However, this arrangement is merely exemplary, as web browser 504 and personal retail list 506 merely need to be accessible to integrated shopping logic 502, and do not necessarily need to be contained within application 200. For example, web browser 504 may be a dynamic-link library (.dll file) provided as part of the operating system that resides outside of the file(s) that store application 200. Alternatively—and particularly when web browser 504 is a general-purpose web browser—web browser 504 may be a set of files that is separate from the file(s) that store application 200 (e.g., web browser 504 may be the .exe file, and related data files, that store the INTERNET EXPLORER browser). Likewise, personal shopping list 506 could be stored within application 200, but could also be stored as one or more files separate from application 200. In a preferred embodiment, personal retail list 506 is stored under a set of registry keys in the WINDOWS registry of the device on which application 200 is installed. (Certain parts of the retail list may be stored outside of the registry; for example, a bitmap for a logo, being several kilobytes in size, may be stored in a separate file.)

Exemplary Structure of a Retail Directory

Figure 6:
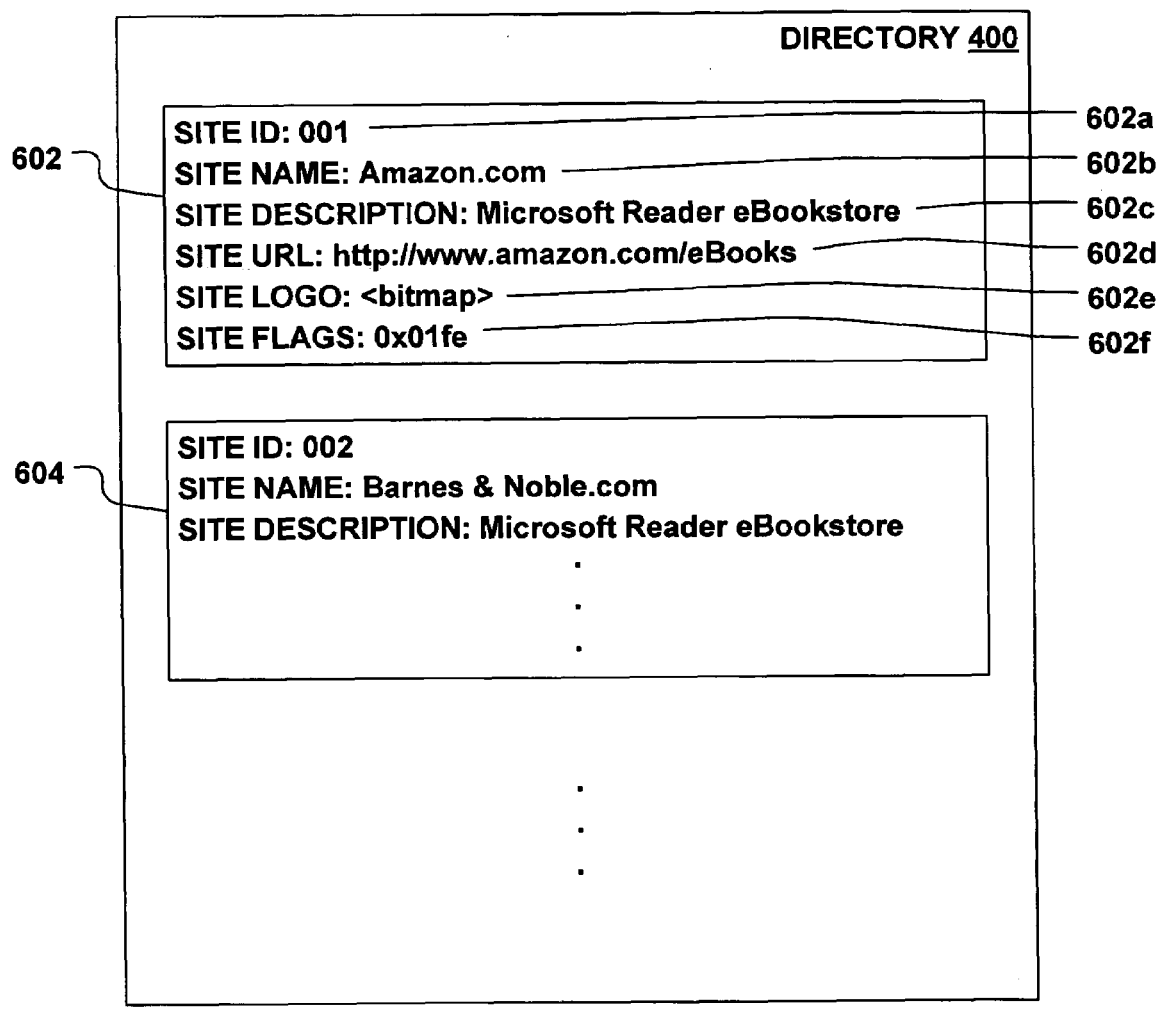
FIG. 6 is a block diagram of an exemplary data structure for a retail directory.

FIG. 6 shows an exemplary structure of retail directory 400. As noted above, retail directory 400 comprises a list of retail sites that may be added to a user's personal retail list. As also noted above, each retail site is represented by certain data. FIG. 6 thus shows an exemplary data structure for retail directory 400, including the various data fields that are used to represent each retail site.

Retail directory 400 lists various retail sites. Each retail site has an entry 602, 604. FIG. 6 shows only two entries, but it will be understood that the number of entries shown is merely exemplary, as retail directory 400 may have any number of entries; the actual number depends on the number of retail sites that are available to be used with an integrated shopping service 300. In the example of FIG. 6, entry 602 and 604 correspond to retail web sites 402 and 404, respectively (shown in FIG. 4).

Each entry in retail directory 400 is represented by various data fields. In the example of FIG. 6, entry 602 includes a site ID 602$a$, a site name 602$b$, a site description 602$c$, a site URL 602$d$, a site logo 602$e$, and site flags 602$f$. Other entries include like data fields. The site ID 602$a$ is a number that is assigned uniquely to each site that appears in the retail directory. The number may, in one example, be used by integrated shopping service 300 to sort the entries when they are displayed to the user. In this case, the particular site ID 602$a$ assigned may be based on a business relationship with the owner/operator of the web site—that is, the distributor of application 200, and the owner/operator of the web site, may agree that the web site will appear in a specified order on the list displayed by integrated shopping service 300, in which case the site ID 602$a$ may be used to fulfill that agreement when the sites are sorted by their respective side IDs. The site name 602$b$ is the commonly used name for a particular web site. For example, the web site whose URL is http://www.amazon.com is commonly known as "amazon.com," and thus the site name field 602$b$ 1contains "amazon.com." The site description 602$c$ is a text string that preferably describes the site. In the example, the site description of "amazon.com" is "Microsoft Reader eBookstore." The site URL 602$d$ is the actual URL at which the site is located, and it may not be shown as part of the user interface. Site logo 602$e$ is a graphical image (e.g., a bitmap) that is associated with the retail site represented by entry 602. Typically, the graphical image is the logo associated with a retail site, although any image may be stored in field 602$e$. Site flags 602$f$ include technical information about the retail site, for example, the file format of site logo 602$e$. It should be understood that data fields 602$a$–602$f$ are merely exemplary, and a web site could be represented by any appropriate data without departing from the spirit and scope of the invention.

The web page that a user's computer 110 downloads when viewing retail directory 400 includes: (a) the information in each entry 602, 604 (or at least a subset of that information), in a format suitable for rendering by a web browser; and (b) executable instructions that cause the information in each entry to be downloaded to the user's computer 110 when the user clicks an "add" button 410 (shown in FIG. 4). It should be noted that the data that is added to a user's personal retail list 506 when an "add" button 410 is clicked may in fact be an exact copy of the data in the selected entry 602, 604.

It should be noted that retail directory 400 may be stored by any means and in any manner that supports the storage of data. As one non-limiting example, all entries 602, 604 may be stored in a file. As a further example, the file that stores entries 602 and 604 may, in fact, be an HTML file that is downloaded to a user's machine for viewing as the retail directory web page. In this case, the retail directory page shown in FIG. 4 is merely the rendering of the HTML page. When retail directory 400 is represented as such an HTML page, some data may be stored in non-printing fields. (E.g., the site ID 602*a*, site URL 602*d*, and site flags 602*f* may be stored in non-printing fields or as part of the scripting code executed by the web page, since those items are not displayed when the retail directory page is rendered on a browser as shown in FIG. 4.)

Exemplary Structure of a Personal Retail List

Figure 7:
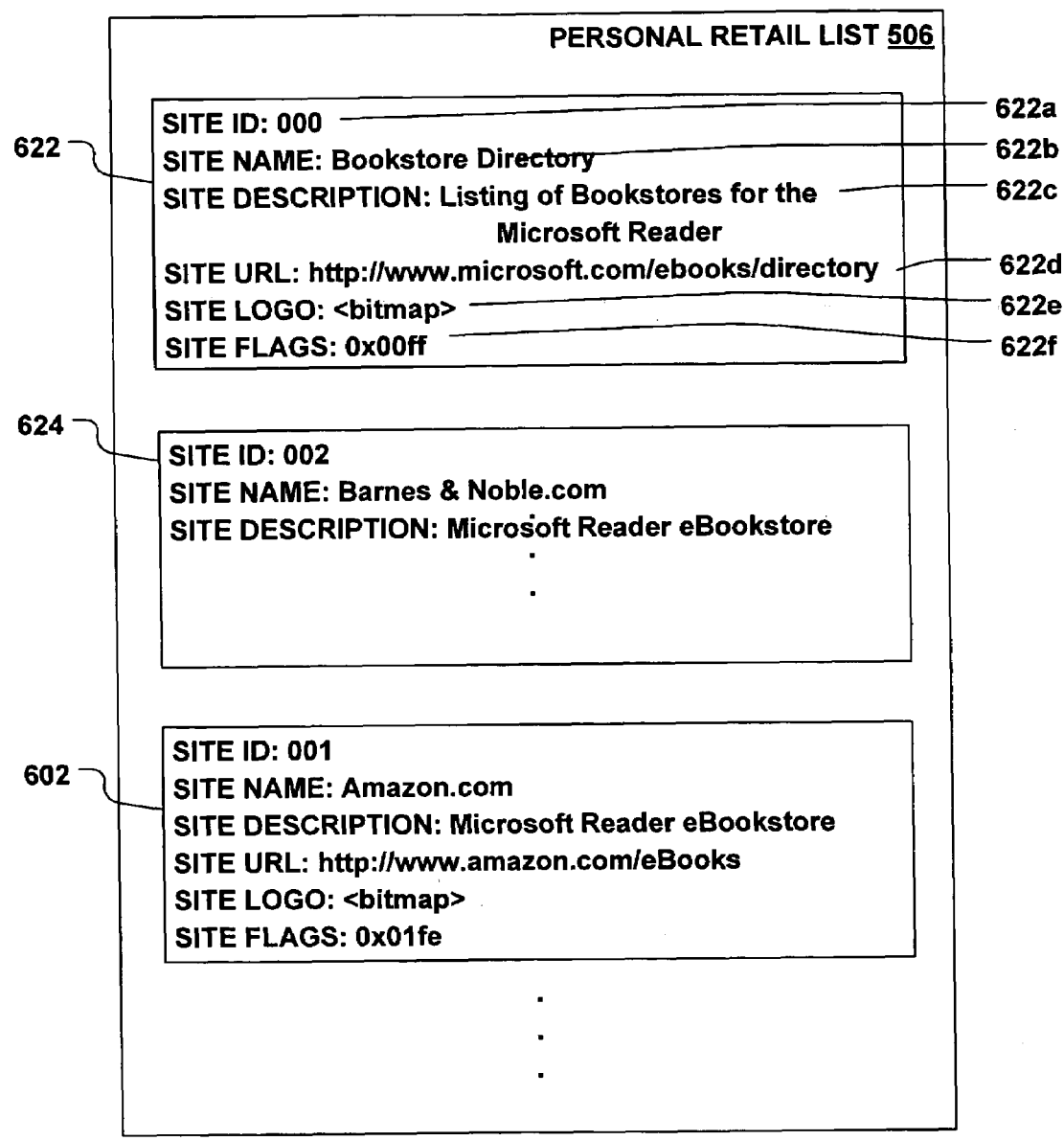
FIG. 7 is a block diagram of an exemplary data structure for a personal retail list.

FIG. 7 shows an exemplary structure of a personal retail list 506, which is stored on the computing device that runs the application 200 with which integrated shopping service 300 is associated. Personal retail list 506 includes a plurality of entries 602, 622, 624, which correspond to the various web sites that a user can access from within integrated shopping service 300. In order for a web site to be accessible from within integrated shopping service 300, an entry corresponding to that web site is included in personal retail list 506.

Entry 622 includes data fields for a site ID 622*a*, site name 622*b*, site description 622*c*, site URL 622*d*, site logo 622*e*, and site flags 622*f*. Entries 624 and 602 include like fields. As can be seen from a comparison between FIGS. 6 and 7, the format of the entries in persona retail list 506 correspond to the format of the entries in retail directory 400. It will be noted that, in the example of FIGS. 6 and 7, entry 602 appears in both personal retail list 506 and in retail directory 400. Preferably, entries in retail directory 400 and personal retail list 506 are in the same format. More preferably, entries are inserted into personal retail list 506 by copying them from retail directory 400, which occurs when a user selects a web site in retail directory 400 to be included in his or her personal retail list 506 by clicking "add" button 410. The process of migrating information from retail directory 400 to personal retail list 506 is described below in connection with FIG. 8.

It will further be observed that the first listed entry 622 in FIG. 7 is an entry for the retail directory 400 itself. This example underscores two points: First, any web site may be listed in personal retail list 506, regardless of whether it is a retail web site or some other type of web site; integrated shopping service 300 is most useful when personal retail list 506 includes at least some retail web sites, but the architecture of integrated shopping service 300 permits any type of web site to be represented in personal retail list 506 (and rendered by web browser 504). Second, as discussed above, retail directory 400 is implemented as an ordinary web site, and thus can be visited like any other website. Moreover, by implementing retail directory 400 as an ordinary web site, retail directory 400 can be designed with the breadth of functionality available to web sites in general (i.e., retail directory 400 may have all the features supported by HTML, and most importantly, it can be updated at any time, even after the application has been installed by the user). This aspect of the invention supports the extensibility of application-integrated retail directories, which is a significant advance.

It will be appreciated that the data structure shown in FIG. 7 is merely exemplary, and personal retail list 506 may store any type of information (in any format), so long as the information identifies those web sites that may be visited from within integrated shopping service 300. Moreover, personal retail list 506 may be stored in any manner (e.g., in a file, under a set of registry keys, inside a database, etc.) without departing from the spirit and scope of the invention. Preferably, personal retail list is at least partly stored under a set of registry keys that can only be modified by the server that provides retail directory 400; this type of storage gives the entity that provides retail directory 400 control over the content of personal retail list 506 by deterring user modification.

Process of Using Retail Directory 400 to Select Retail Web Sites

Figure 8:
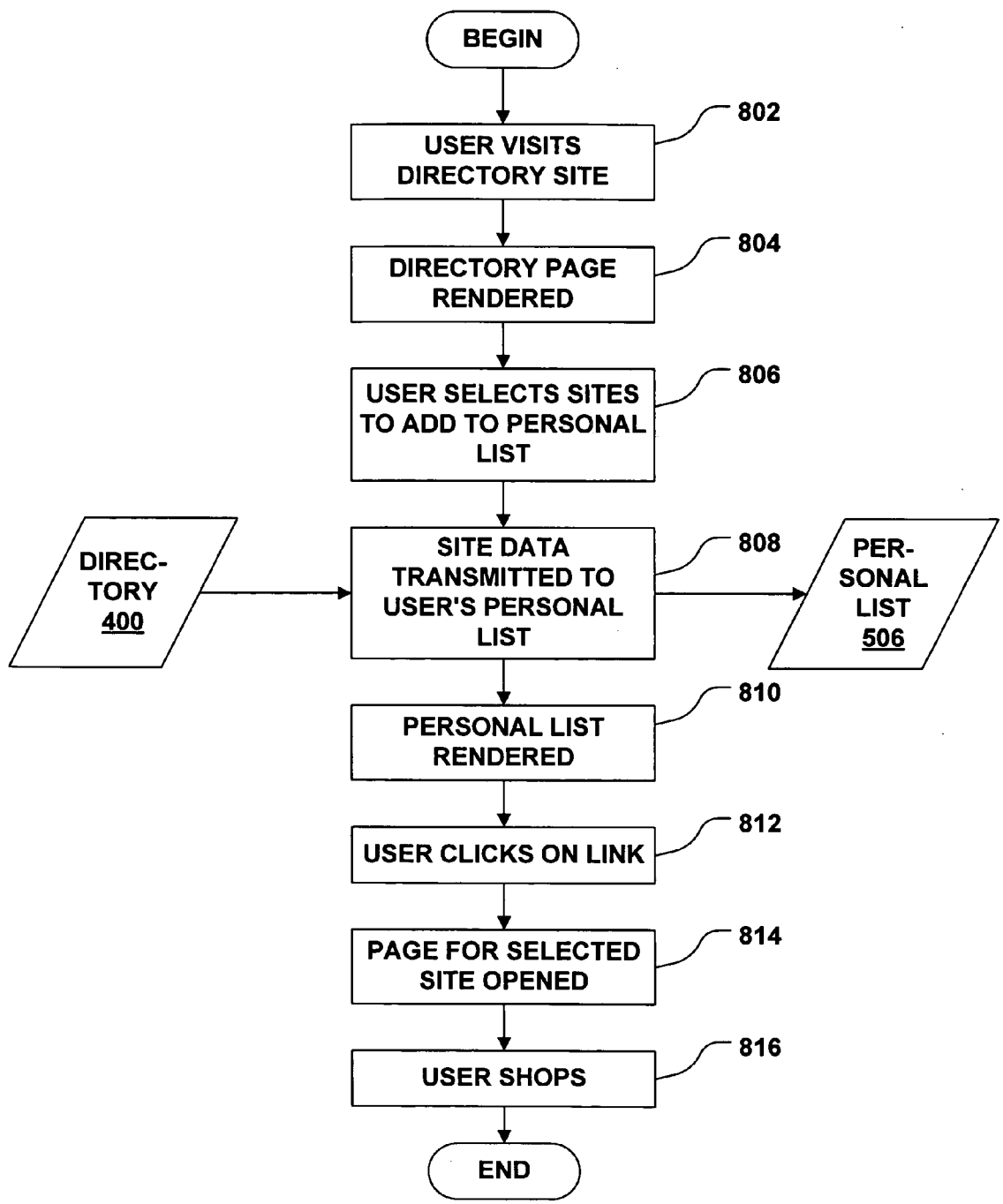
FIG. 8 is a flow diagram of an exemplary process for using a retail directory to add retail web sites to a personal list, in accordance with aspects of the invention.

FIG. 8 shows an exemplary process by which a user accesses retail directory 400 and adds web sites to his or her personal retail list 506. At step 802, the user visits retail directory 400. This action may be performed by a user's opening an ordinary stand-alone browser (e.g., the MICROSOFT INTERNET EXPLORER browser), and visiting the retail directory web site by entering a URL. Preferably, the URL of the retail directory 400 web site is included in personal shopping list 506 (or is otherwise incorporated into application 200 that includes integrated shopping service 300), so that the user may visit the retail directory web site using integrated shopping service 300. In one example, application 200 is delivered to the user with a personal shopping list 506 that includes an entry for retail directory 400, so that the user will initially be able to access retail directory 400 from integrated shopping service 300.

At step 804, the retail directory page is rendered on the user's device. The rendering is performed either by a standalone browser (if the user uses a stand-alone browser to visit the web page), or by web browser 504 (shown in FIG. 5), if integrated shopping service 300 has been used to visit retail directory 400.

At step 806, the user selects web sites to add to personal retail list 506. As noted above in connection with FIG. 4, the user may make this selection by "clicking" on an "add" button 410. In response to the user's selection, an entry for the selected web site is inserted into the user's personal retail list 506 (step 808). As shown in FIG. 8, the step of inserting this entry may be performed by copying an entry from retail directory 400 to personal list 506 (e.g., by copying the data over the Internet).

After a user has selected a web site from retail directory 400 and the appropriate entry has been inserted into personal retail list 506, the user may invoke the integrated shopping feature 300 in order to visit those sites in personal retail list 506 (including the sites that the user just added at steps 802–808). When integrated shopping service 300 is invoked, links to the web sites in the user's personal retail list 506 are rendered (step 810). (FIG. 3 shows an example of the integrated shopping service 300 rendering links to sites that are listed in personal retail list 506). In order to visit one of the sites, the user clicks on the links (step 812), at which point the page for the selected site is opened (step 814). The user is then able to browse the selected site and shop for content (step 816).

EXAMPLE

Use of Integrated Shopping Service to Purchase eBooks

Figure 9:
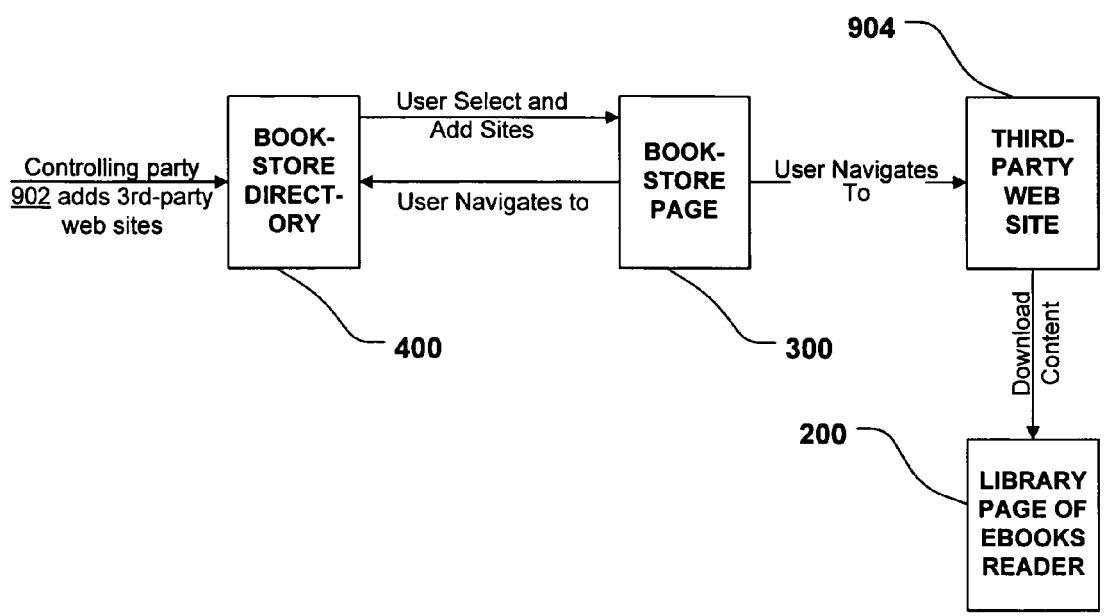
FIG. 9 is a block diagram of aspects of an exemplary system architecture according to the invention, indicating an exemplary flow of information through the architecture.

FIG. 9 shows an example in which the present invention is used to purchase electronic books (eBooks) from within an eBooks rendering software application.

As shown in FIG. 9, a controlling party 902 adds third-party web sites to retail directory 400. In this example, retail directory 400 is a "bookstore directory," which lists retail web sites that distribute eBooks. Controlling party 902 is the party that controls the constituency of bookstore directory 400. For example, controlling party 902 may be the manufacturer and/or distributor of the application 200 which uses integrated shopping service 300. As another example, controlling party 902 may be a different party that has been engaged to control which web sites may be listed in bookstore directory 400.

A user may navigate to bookstore directory 400—e.g., by using a stand-alone browser, or by using integrated shopping service 300 (which, as noted above, may include a browser). The user views the bookstore directory 400 and chooses web sites from bookstore directory 400 to add to his or her personal retail list 506 (shown in FIG. 5). In response to the user's selection, bookstore directory 400 transmits to the user's machine data (e.g., the "entries" shown in FIGS. 6 and 7) that correspond to the user's chosen web sites. These choices are stored in personal retail list 506 and are displayed on the user interface of integrated shopping service 300, which, in this example, is a "bookstore page."

From bookstore page 300, the user navigates to a "third-party web site." The third-party web site is one of the sites displayed on the bookstore page. For example, and referring for the moment back to FIG. 3, link 304 ("Barnes & Noble.com") is an example of a third-party web site. As previously noted, integrated shopping service 300 (which is bookstore page 300, in this example) includes or employs a browser (or equivalent browsing functionality), which allows a user to navigate to the third-party web sites from within the application of which integrated shopping service/bookstore page 300 is a part. The user then uses the third-party web sites to shop for content. In this example, the third-party web sites are electronic bookstores that provide eBooks. Thus, the user can purchase eBooks from the third-party web sites from within the eBook-reading application, and download such eBooks to his or her computing device.

Once the eBooks are downloaded to the user's computing device, a list of downloaded eBooks is displayed by the rendering application. For example, the purchased eBooks may be displayed on a "library page," such as that shown in FIG. 2. The user may then use the eBook-reading application to open and render the eBooks.

Authentication of Directory Entries

To enable an application manufacturer to control the set of retailer web sites that may be accessed from within a content-rendering application in accordance with this invention, a signature is added to the directory entry for each site. Before a link to a web site is rendered on a user's computer in shopping service 300 (shown in FIG. 3), the signature is authenticated. If the signature for a particular web site cannot be authenticated, then no link to that web site is displayed. By signing retail directory entries and authenticating the signatures before rendering the entries on a user's computing device, the application can be trusted not to render web site links if the entry cannot be authenticated, and therefore prevents unapproved web sites from being offered.

The signature may be created by hashing data in the entry and signing the hash with a private key, although any digital signature technique may be used. The private key used to generate the hash (this key is embedded in the signing tool) is preferably a secret maintained by the manufacturer of the content-rendering application. It will be appreciated, however, that an entity other than the application manufacturer may be designated to control the addition of entries to the directory, in which case the private key may be maintained by such other entity.

Figure 10:
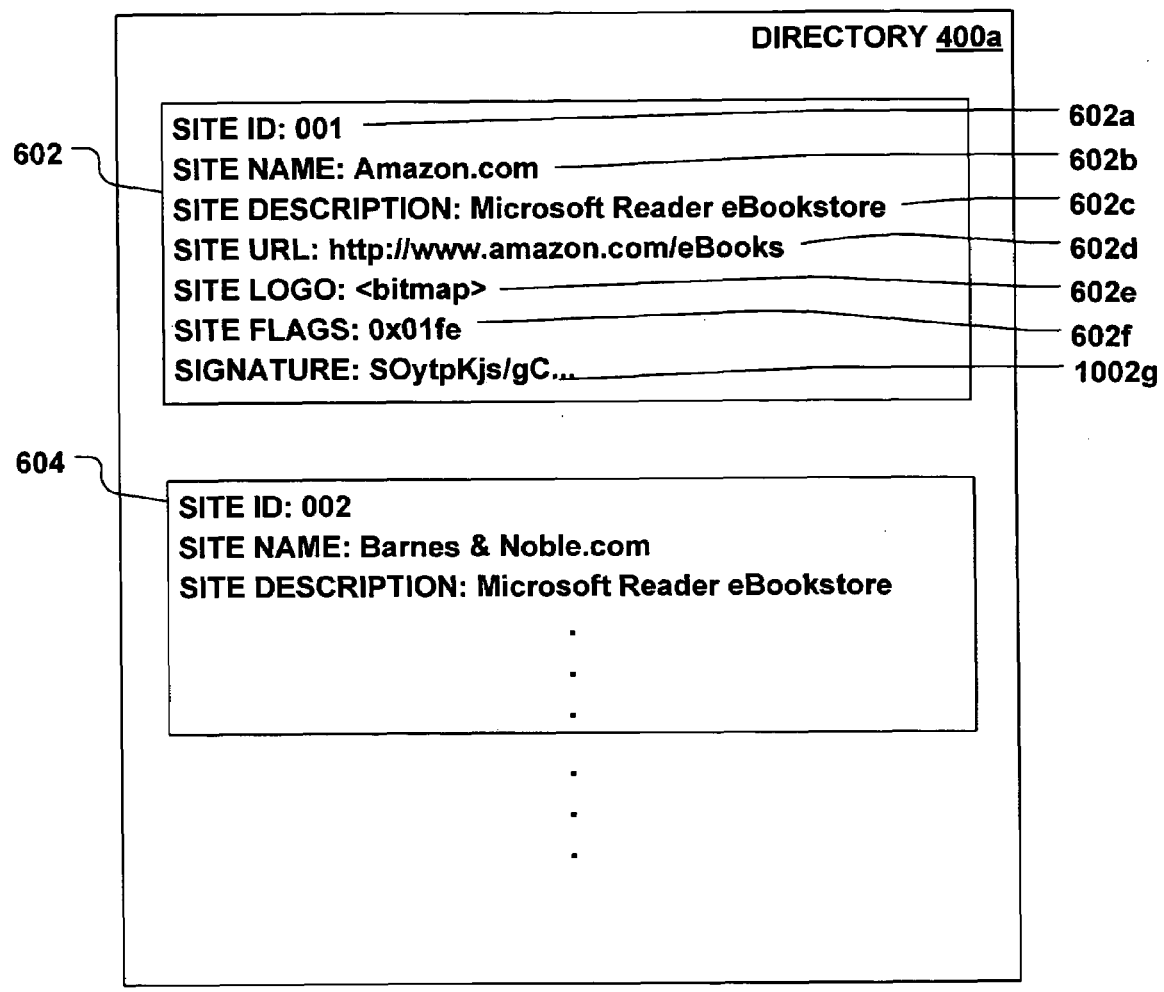
FIG. 10 is a block diagram of an exemplary data structure for a signed retail directory.

In a preferred embodiment, the signature is generated and added to a site by the content rendering application manufacturer (or other authorized entity). FIG. 10 shows the structure of a retail directory 400a. It will be observed that retail directory 400a is similar to retail directory 400 (shown in FIG. 6), except that each entry in retail directory 400a includes a signature. Retail directory 400a includes a plurality of retail site entries 602, 604. Exemplary retail site entry 602 contains site identifier 602a, site name 602b, site description 602c, site URL 602d, site logo 602e, and site flags 602f, as previously discussed in connection with FIG. 6. Retail site entry 602 also contains a signature 1002g. Retail site entries 604, etc., contain similar information. Signature 1002g is based on some or all of the data contained in items 602a–602f, and may be created by any digital signature technique. Preferably, signature 602g is based on items 602a–602d, but not on site logo 602e or site flags 602f. Site logo 602e is typically a bitmap that represents logo 402, 404 (shown in FIG. 4), which is generally a relatively large amount of data as compared with the other items in entry 602, 604. Since it is costly of resources to sign large amounts of data, and since it is unlikely that a user would tamper with the directory merely to change the icon associated with a site, the signature is preferably not based on site logo 602e. Similarly, it would seem unlikely that site flags 602f would be tampered with and hence site flags 602f preferably is not signed.

It should be understood that data fields 602a–602f are merely exemplary, and a web site could be represented by any other appropriate data without departing from the spirit and scope of the invention. Retail directory 400a may be stored by any means and in any manner that supports the storage of data, as previously discussed.

Figure 11:
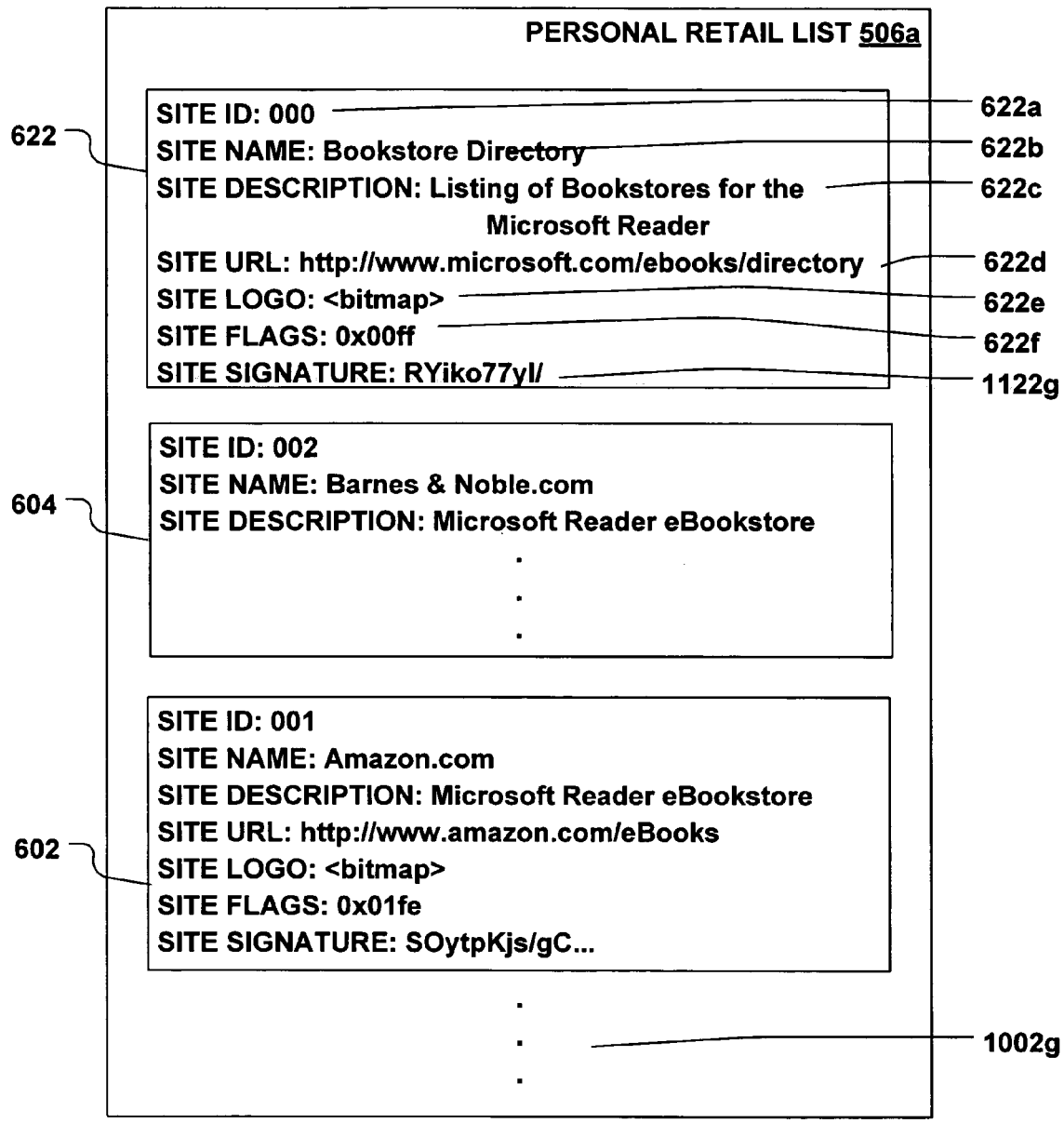
FIG. 11 is a block diagram of an exemplary data structure for a signed personal retail list.

FIG. 11 shows an exemplary structure of a personal retail list 506a. Personal retail list 506a is similar to personal retail list 506 whose structure is shown in FIG. 7, except that the entries in personal retail list 506a include signatures. Personal retail list 506a is stored on the computing device that runs application 200, as discussed above in connection with personal retail list 506. Personal retail list 506a includes a plurality of signed entries. It will be observed that the format of the entries in personal retail list 506a is the same as that of the entries in directory 400a, and at least some of the entries in personal retail list 506a may, in fact, be copied from retail directory 400a (although it should be appreciated that personal retail list 506a may store information in any format, which need not be identical to that used in directory 400a). For example, in FIG. 11 signed entry 602 is a copy of the signed entry 602 that appears in directory 400a. An exemplary entry 622 in personal retail list 506a includes data fields for site identifier 622a, site name 622b, site description 622c, site URL 622d, site logo 622e, site flags 622f, and signature 1122g, which are analogous to the similar fields 602a–602f and 1002g, shown in FIG. 10. Entries 604 and 622 include like fields.

It will be appreciated that the data structure shown in FIG. 11 is merely exemplary, and personal retail list 506a may store any type of signed information (in any format), so long as the information identifies those web sites that may be visited from within integrated shopping service 300. Moreover, personal retail list 506 may be stored in any manner without departing from the spirit and scope of the invention. Like personal retail list 506, the data in signed personal retail list is preferably stored under a set of registry keys that can only be modified by the server that provides retail directory 400a.

Process of Adding Signed Entries to Retail Directory

Figure 12:
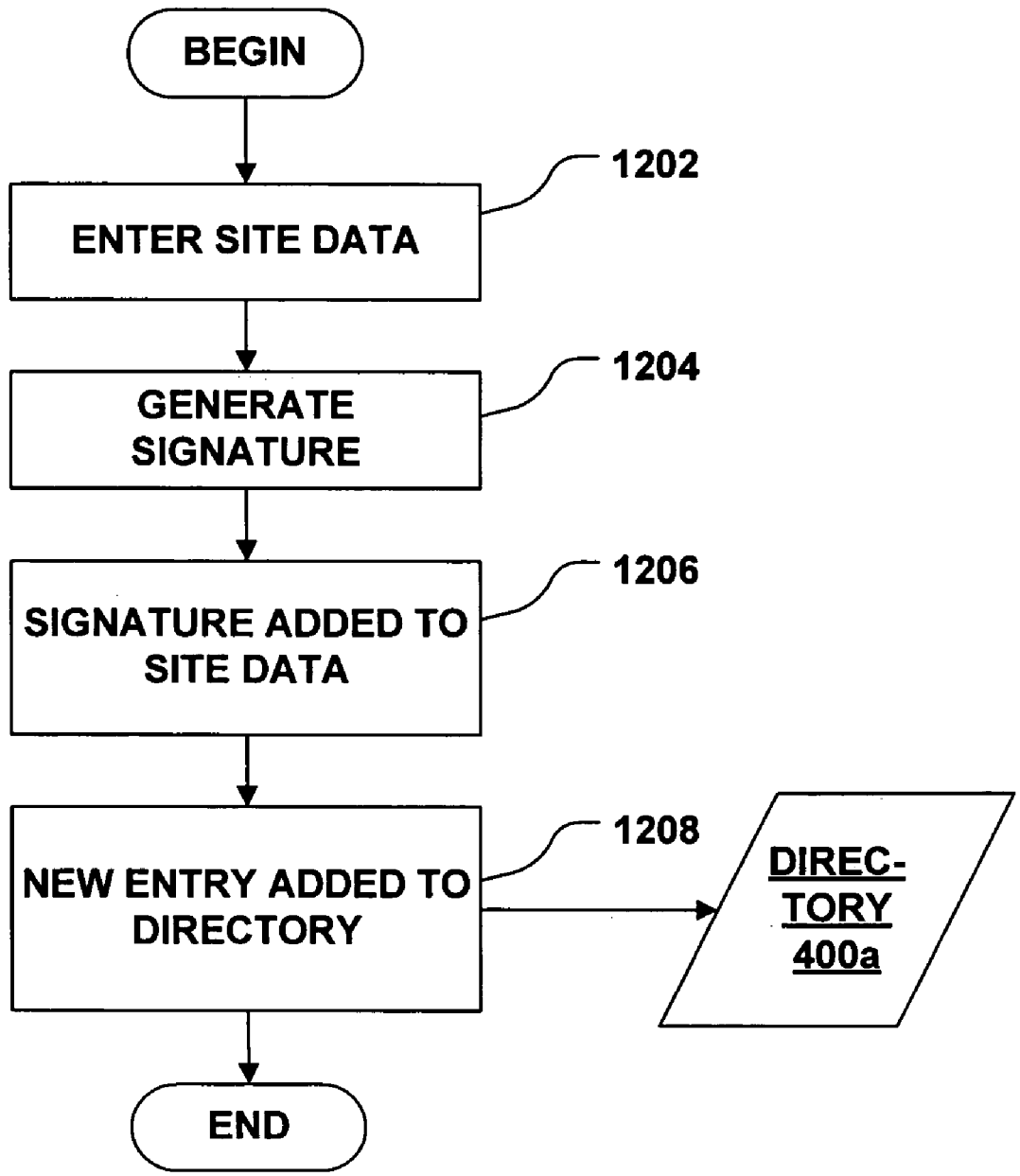
FIG. 12 is a flow diagram of an exemplary process for adding signed data to a retail directory.

FIG. 12 shows an exemplary process by which a signature is signed and added to a retail directory by a signing authority. At step 1202 of FIG. 12, site data is entered for a web site that is to be signed. The particular site data that is used at step 1202 is the site data that will form the basis for the signature. As noted above, this data may not include all of the data in the site's entry in the directory; for example, the data that forms the basis for the signature may exclude the site logo and site flags.

At step 1204 a signature-generating tool (e.g., the tool depicted in FIG. 14 below) is employed to generate a signature using a private key. Any digital signature technique (e.g., the RSA algorithm, etc.) may be used to generate the signature. Typically, the signature is generated cryptographically using a private key, and the corresponding public key is distributed to or as part of applications that use the signed data (e.g., content-rendering application 200 which includes integrated shopping service 300) so that such applications may verify the signature, e.g. establish that the site data matches the given signature. When the signature is generated with this method, access to the private key is preferably restricted, since the ability to place an entry in the directory with a valid signature is a valuable asset.

At step 1206, the generated signature is added to the site data. For example, the signature may be included as item 1002g (shown in FIG. 10) in a directory entry (such as directory entry 602, shown in FIG. 10). At this point, the signing of a directory entry is complete. At step 1208, the signed site data is added to retail directory 400a.

Process of Obtaining and Authenticating Signed Retail Entries

Figure 13:
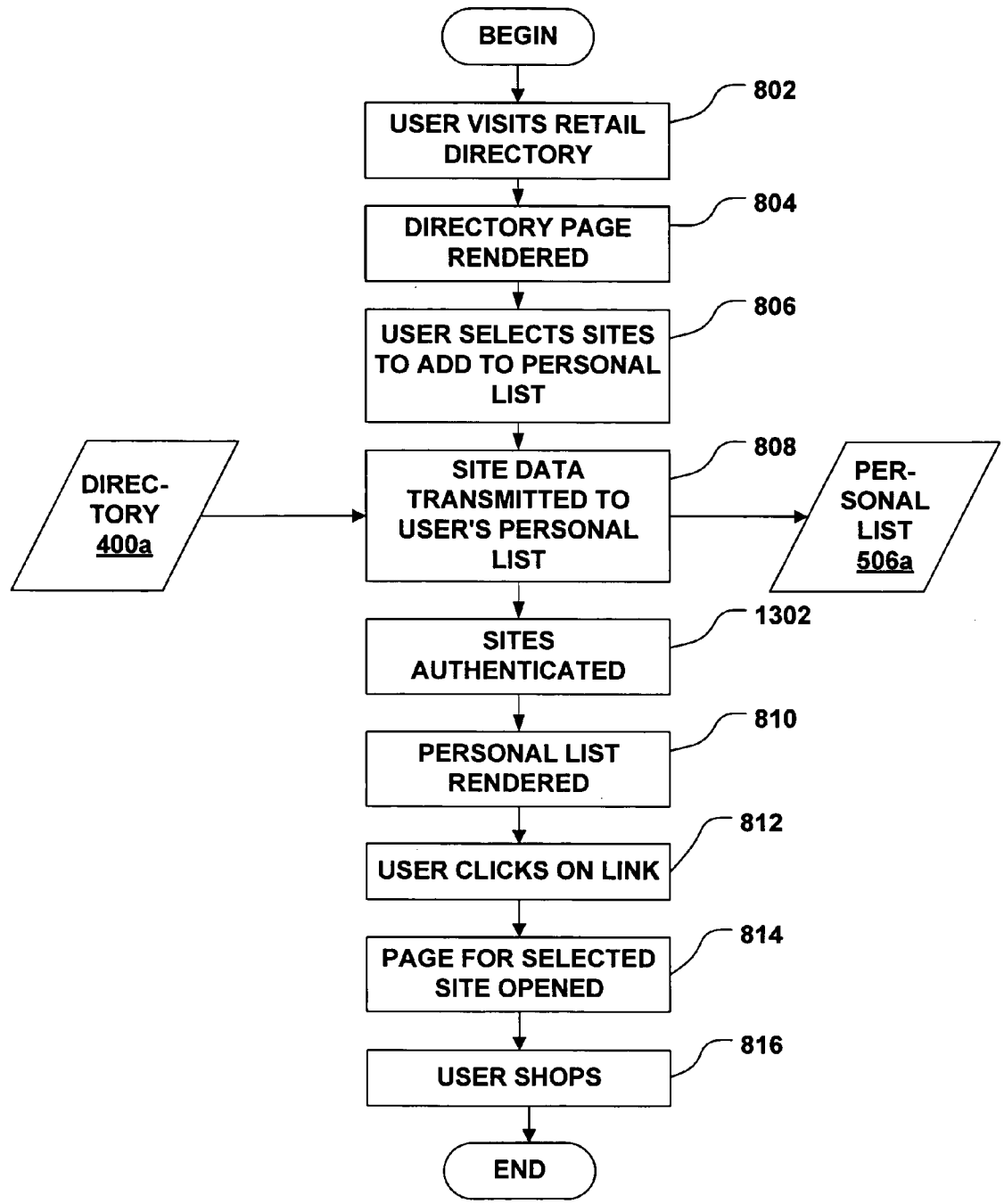
FIG. 13 is a flow diagram of an exemplary process for adding authenticated data to a personal retail directory.

FIG. 13 shows a process for selecting and using signed retail site data in accordance with the invention. It will be observed that the process depicted in FIG. 13 includes all of the steps shown in FIG. 8 (which are described above), but also adds an authentication step 1302. Moreover, it will be observed that the directory from which retail sites are obtained is directory 400a (containing signed data) rather than directory 400. Before a link to a particular web site is rendered (at step 810), its representative data in personal retail list 506a is authenticated at step 1302 by verifying the signature associated with that data.

If an entry in personal retail list 506a cannot be authenticated, no link to the web site represented by such entry is displayed by the integrated shopping service. Preventing the display of a non-authentic link provides a mechanism for enforcing the condition that the integrated shopping service support only approved web sites.

Tool for Creating Authenticatable Directory Entries

Figure 14:
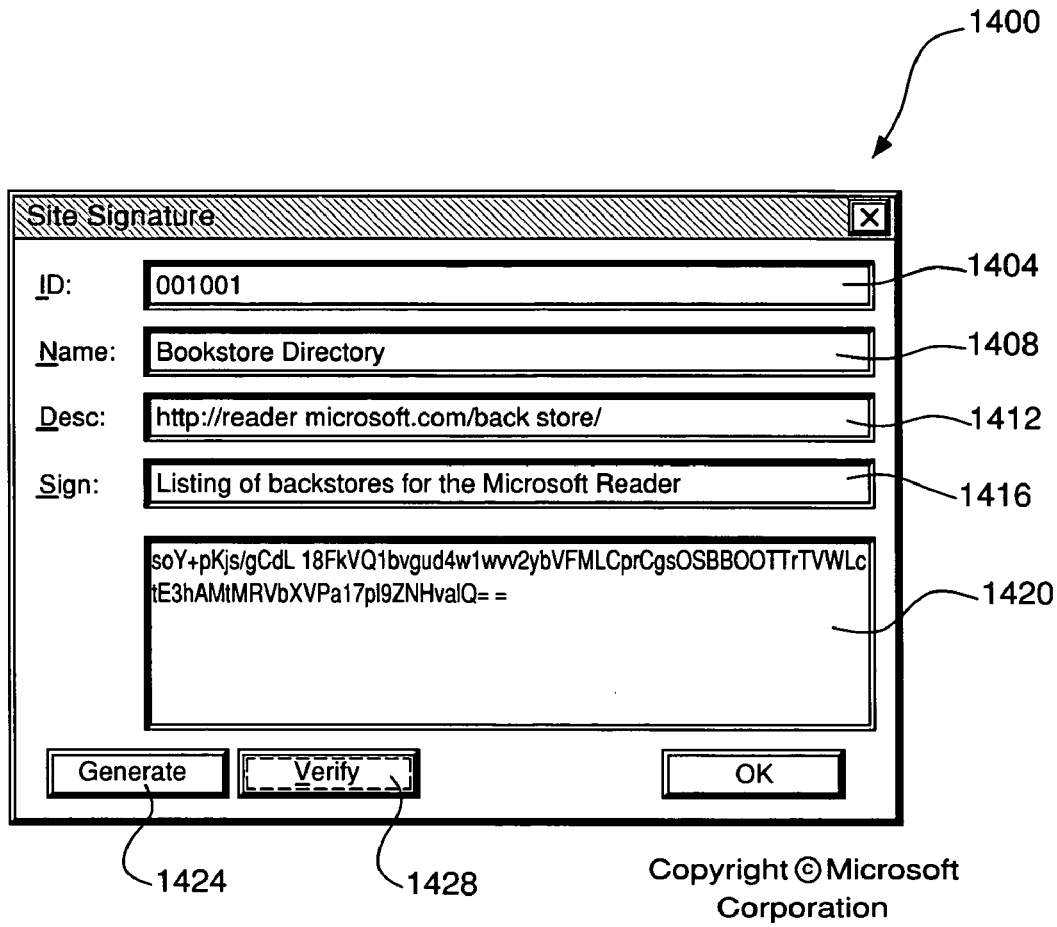
FIG. 14 is a diagram of a user interface for a site signature tool for signing and verifying data according to one aspect of the invention.

Referring now to FIG. 14, a user interface is shown for a tool 1400 that signs entries for inclusion in the retail directory 400a, and whereby an application may verify the signature so that the entry may be used. The tool is used by a "signing authority" (e.g., the manufacturer of the user application, or another entity that controls the constituency of the shopping directory) in order to sign directory entries that have been approved for placement in directory 400a. The interface for tool 1400 may include data entry fields for site ID 1404, site Name 1408, site URL 1412, and site Description 1416. Interface 1400 may also include a "Generate" button 1424 and a "Verify" button 1428. In order to generate a signature, displayed in field 1420, a site ID, site name, site URL and site description is entered. When the signing authority clicks on the "Generate" button 1424, a signature is generated. In an environment employing a graphical user interface with typical copy-and-paste features, the signature may be copied out of Signature field 1420 and pasted into an appropriate location—e.g., into the directory file, at the signature field for the web site entry that is being signed.

Preferably, the signature is generated by hashing the information in fields 1404, 1408, 1412, and 1416, and encrypting the hash with a private key. In a preferred embodiment, the hash generated is 1024 bits in length to deter tampering and is base-64 encoded, although other key lengths may be utilized and other encoding methods (or no encoding at all) may be used without departing from the spirit and scope of the invention.

If a signature is to be verified, a site ID is entered at field 1404, a site name is entered at field 1408, a site URL at field 1412, a site description at field 1416, and a signature at field 1420. Activation of the "Verify" button 415 causes the tool to verify that the signature in field 1420 is correct. The signature is verified using the public key that corresponds to the private key used to generate the signature. If the signature proves to be authentic, then signing tool 1400 may display a message so indicating. If the signature is not authentic, this fact may also be indicated by an appropriate message.

It should be appreciated that the user interface shown in FIG. 14 is an exemplary mode of using a signature generation/verification tool, and is optional. Typically, such a tool would be used by the entity that controls the makeup of the directory in order to generate signatures (or possibly verify signatures on entries in which tampering has been suspected). A user application that verifies signature as a prerequisite to displaying entries typically performs the signature verification internally in a manner that is transparent to the user and does not involve communication with the user.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of facilitating commerce over a communications network comprising:
   generating data indicative of a retail web site;
   contacting the retail web site from within a directory feature of an integrated shopping service of a client computer, said integrated shopping service comprising a content-rendering application, a retail shopping user interface, and the directory feature, wherein a list of on-line retailers displayed by the directory feature enables navigation to a retailer on the list of on-line retailers directly through the list and wherein the list of on-line retailers is selected by a user of said client computer;
   generating a signature of said data using a private key;
   providing said data and said signature to a plurality of computing devices;
   providing to said plurality of computing devices a public key corresponding to said private key; and
   providing to said plurality of computing devices a set of computer-executable instructions which performs acts comprising:
   determining the authenticity of said data against said signature; and
   displaying a link to said web site upon a determination that said data is authentic.

2. The method of facilitating commerce of claim 1, wherein said web site vends a content item, and wherein said computer-executable instructions perform acts further comprising rendering said content item.

3. The method of facilitating commerce of claim 1, wherein the act of providing said public key comprises including said public key in-line in said computer-executable instructions.

4. The method of facilitating commerce of claim 1, further comprising the act of restricting access to said private key.

5. The method of facilitating commerce of claim 1, wherein the act of providing said computer-executable instructions comprises downloading said computer-executable instructions to said plurality of computing devices using a computer network.

6. A computer-readable medium having computer-executable instructions to perform the method of claim 1.

7. A system for using a computer network comprising:
   a memory location which stores data and a signature received from a directory server, said data being indicative of a web site on a computer network, said signature being based on said data;
   an authentication module which verifies the authenticity of data against said signature and provides an indication of whether said data is authentic;
   a shopping module which receives said indication and which conditionally displays a link to said web site according to said indication; and
   a web browser for contacting web site contacted from within a directory feature of an integrated shopping service of a client computer, said integrated shopping service comprising a content-rendering application, a retail shopping user interface and a directory feature, wherein a list of on-line retailers displayed by the directory feature enables navigation to a retailer on the list of on-line retailers directly through the list and wherein the list of on-line retailers is selected by a user of said client computer.

8. The system of claim 7, wherein said web site distributes a content item, and wherein said system further comprises a module which renders said content item.

9. The system of claim 7, further comprising a module that navigates to the web site.

10. The system of claim 7, wherein the signature comprises a hash of said data.

11. The system of claim 7, wherein said memory location comprises one or more registry keys.

12. The system of claim 7, wherein said authentication module uses a public key to verify the authenticity of said signature, said signature being based on a private key corresponding to said public key.

13. A method of providing access to web sites comprising:
    creating a list of web sites;
    contacting said web sites using a web browser from within a directory feature of an integrated shopping service of a client computer, said integrated shopping service comprising a content-rendering application, a retail shopping user interface and the directory feature, wherein a list of on-line retailers displayed by the directory feature enables navigation to a retailer on the list of on-line retailers directly through the list and wherein the list of on-line retailers is selected by a user of said client computer;
    providing, to a plurality of computing devices, computer-executable instructions which access said web sites; and
    limiting access to said web sites by performing acts which include:
    generating signatures for one or more of the web sites on said list using a key; and
    restricting access to said key;
    wherein said computer-executable instructions include instructions which authenticate said signatures and which deny access to a web site on said list whose signature fails to authenticate.

14. The method of claim 13, wherein said web site distributes digital content items renderable by said computing devices.

15. The method of claim 14, wherein said digital content items comprises text.

16. The method of claim 14, wherein said digital content items comprises audio.

17. The method of claim 14, wherein said digital content items comprises video.

18. The method of claim 14, wherein said digital content items comprises software.

19. The method of claim 13, further comprising establishing a contract with owners of said web sites.

20. The method of claim 13, wherein said key comprises a private key and wherein said computer-executable instructions use a public key corresponding to said private key to authenticate said signatures.

21. A computer memory which stores a data structure produced by acts comprising:
    accessing a list which includes a plurality of web sites, each of said web sites having a corresponding signature;
    contacting each of said web sites using a web browser from within a directory feature of an integrated shopping service of a client computer, said integrated shopping service comprising a content-rendering application, a retail shopping user interface and the directory feature, wherein a list of on-line retailers displayed by the directory feature enables navigation to a retailer on the list of on-line retailers directly through the list and wherein the list of on-line retailers is selected by a user of said client computer;

determining the authenticity of each web site on said list against its corresponding signature;

including in said data structure a first set of said web sites which are determined to be authentic against their respective signatures; and excluding from said data structure a second set of said web sites which fail to authenticate against their respective signatures.

22. The data structure of claim 21, wherein said data structure includes a universal record locator for each web site in said first set.

23. The data structure of claim 21, wherein said accessing act comprises accessing a set of registry keys.

* * * * *